UNITED STATES PATENT OFFICE.

EBENEZER PENFIELD, OF OBERLIN, OHIO.

IMPROVED MEDICAL COMPOUND.

Specification forming part of Letters Patent No. 47,035, dated March 28, 1865.

*To all whom it may concern:*

Be it known that I, EBENEZER PENFIELD, of Oberlin, in the county of Lorain and State of Ohio, have invented a new and Improved Medical Compound; and I do hereby declare that the following is a full, clear, and exact description of the same.

This invention relates to the employment or use of the gummy and resinous substances contained in the various parts of the flax-plant prepared in various ways, and applied either externally or internally, as a remedy for various diseases—such as the ring-worm, cuts, bruises, burns, corns, callous skin, contracted sinews or cords, or for coughs, cold in the head, fever, looseness of the bowels, diarrhea, scrofula, &c. The extract is applied in the form of liquid or in sirup form, or in the form of snuff; or it may be used externally as an ointment.

The extract of flax may either be obtained from linen rags or from the flax-plant directly. For the purpose of obtaining the extract from linen rags, I burn them on a steel plate or other metal surface, on which the rags are spread loose, so that they will burn quick, and as soon as the flame subsides I take a wet rag and wipe the solid products of combustion, ashes and all, into a bowl with water. After repeating this operation three or more times the water in the bowl becomes charged with a sufficient quantity of resinous substance originally contained in the flax to render it suitable for medical purposes; or instead of wiping the ashes and all into the water, the solid products of combustion may be collected on a linen cloth and with the cloth put in the water, and then the cloth is washed and wrung, and the same result is obtained as above described. The extract of the flax is, however, obtained from the flax-plant direct with greater ease and in greater abundance than from linen rags. In preparing flax for spinning, a glutinous gummy substance contained in the same must be removed, and this purpose I effect by steeping the flax in large vats for two or three days, heating the water for part of the time to the boiling temperature. After the flax has been removed from the liquid it is strained and squeezed between rollers to free it from the adhering water and glutinous substance, and the water or liquid thus obtained is boiled down in the same manner as maple-sap for sirup. After it has reached the desired consistency it is either removed from the kettle and bottled in the form of sirup or it may be boiled still further over a slow fire till, when cold, it will be as hard as good putty. Then let it stand in the kettle till cold, and it will come out cleaner than when hot. It is then fit for being boxed. It must stand in such a situation that it can ferment for a few days before it is bottled or boxed, and as long as the bottle or box is closed air-tight the sirup or gum remains in the position in which it was put up; but if the box or bottle is open, the contents are liable to become hard and dry; but they will soon yield to water.

When the gum has become hard and dry it may be ground and used in the form of snuff, as a remedy for a cold in the head. In fact, the sanitive power of the extract of flax, whether obtained in the manner above described or in any other desirable manner, is such that the same is felt in whatever form the same may be used or applied.

I claim as new and desire to secure by Letters Patent—

The use for medical purposes of an extract of flax, prepared substantially in the manner herein set forth.

EBENEZER PENFIELD.

Witnesses:
 W. P. HARRIS,
 GEORGE KINNEY.